United States Patent [19]

Wickström

[11] Patent Number: 4,498,841
[45] Date of Patent: Feb. 12, 1985

[54] TURNOVER DEVICE

[75] Inventor: Claes G. Wickström, Halmstad, Sweden

[73] Assignee: Riensch & Held (GmbH & Co.), Hamburg, Fed. Rep. of Germany

[21] Appl. No.: 458,806

[22] Filed: Jan. 18, 1983

[51] Int. Cl.³ .............................................. B65G 7/02
[52] U.S. Cl. ................... 414/778; 280/47.12; 414/783
[58] Field of Search ............... 414/425, 754, 758, 763, 414/764, 766, 767, 778, 779, 780, 781, 782, 783, 784; 280/47.12; 269/17

[56] References Cited

U.S. PATENT DOCUMENTS

| 446,404 | 2/1891 | Curtis | 280/47.12 X |
| 1,288,138 | 12/1918 | Nicoson | 414/778 X |
| 2,029,656 | 2/1936 | Dawson | 280/47.12 X |
| 2,520,252 | 8/1950 | Mutchler | |
| 3,083,840 | 4/1963 | Gibbs | 414/778 X |
| 3,429,456 | 2/1969 | Burgher | 414/766 |
| 4,124,126 | 11/1978 | Abraham | |
| 4,173,428 | 11/1979 | Thornberg | 414/778 X |

FOREIGN PATENT DOCUMENTS

| 239150 | 7/1964 | Austria | 414/780 |
| 2628504 | 6/1976 | Fed. Rep. of Germany | |
| 70546 | 12/1958 | France | 414/778 |
| 353294 | 7/1971 | Sweden | |
| 416934 | 2/1981 | Sweden | |

Primary Examiner—Leslie J. Paperner
Attorney, Agent, or Firm—Beveridge, DeGrandi and Kline

[57] ABSTRACT

The turnover device has a frame structure with U-shaped runners and movable loading forks for gripping the load, preferably pallets. The overall center of gravity of the load and the device is in the vicinity of the center of curvature of the runners. Rollers are provided to enable the device also to be used as a transporting means. One or more casters can be moved into the area within the runners, so that the latter do not impede the 180° turnover.

9 Claims, 5 Drawing Figures

TURNOVER DEVICE

BACKGROUND OF THE INVENTION

The present invention relates to a turnover device, particularly for pallets, which has a frame structure with U-shaped runners and a mechanism which receives the pallets.

Such devices are required, for example, in printing works for transporting and turning over paper, if it is necessary to print both sides of the sheet of paper.

Various devices are known for the purpose of turning over pallets or similar loads (U.S. Pat. Nos. 2,520,252 and 4,124,126 and Swedish Pat. No. 416,934). These known devices are very complicated and are designed in a cumbersome manner, so that their manufacture is relatively costly. In addition, they are difficult and complicated to handle.

BRIEF SUMMARY OF THE INVENTION

The problem of the invention is to provide a turnover device of the aforementioned type, which can be easily and inexpensively manufactured and which permits easy and economic handling.

This problem is solved by the teaching of this invention.

BRIEF DESCRIPTION OF THE DRAWINGS

The invention is described in greater detail hereinafter relative to a non-limitative embodiment and the attached drawings, in which.

DETAILED DESCRIPTION OF THE PREFERRED EMBODIMENT

Figure 1:
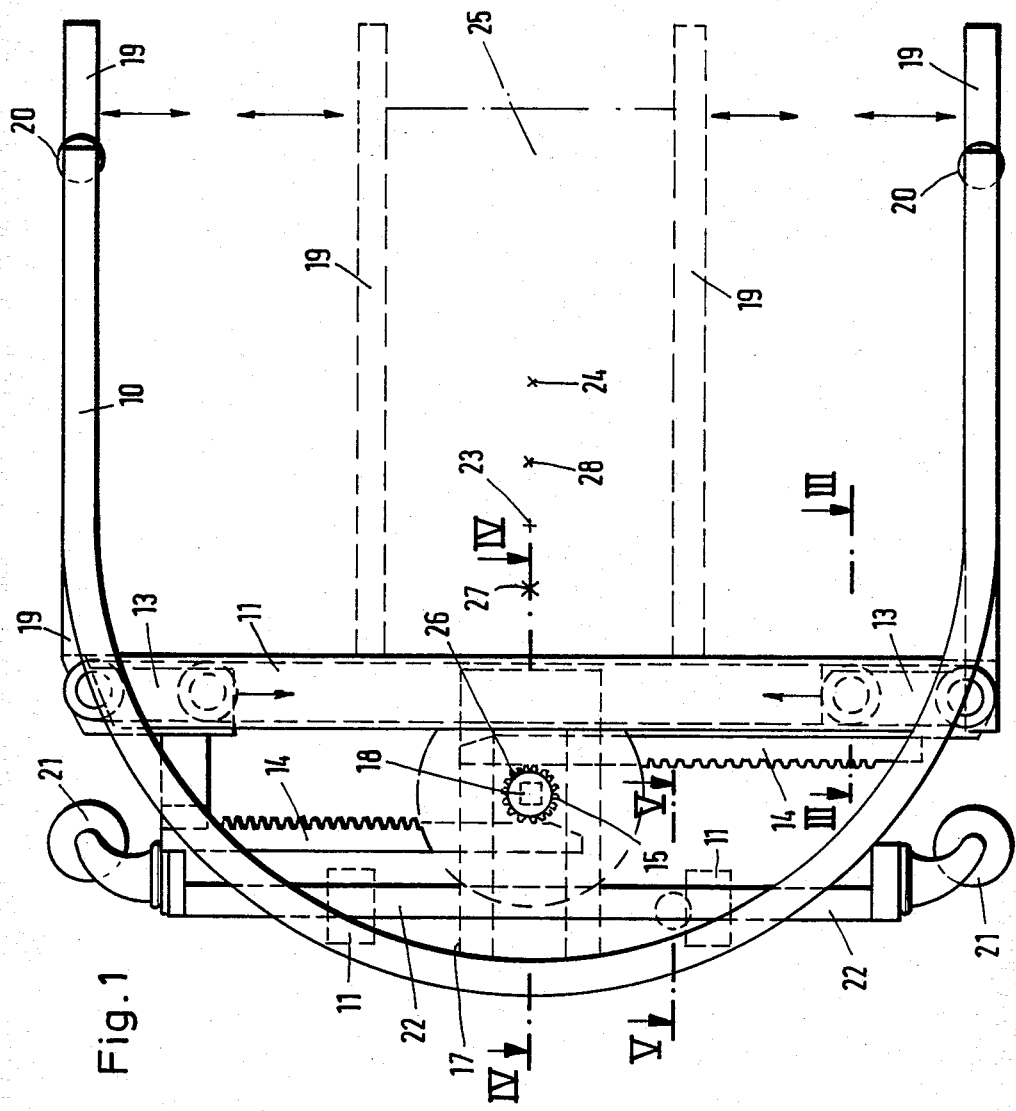
FIG. 1 is a side view of an embodiment of the turnover device according to the invention.
Figure 2:
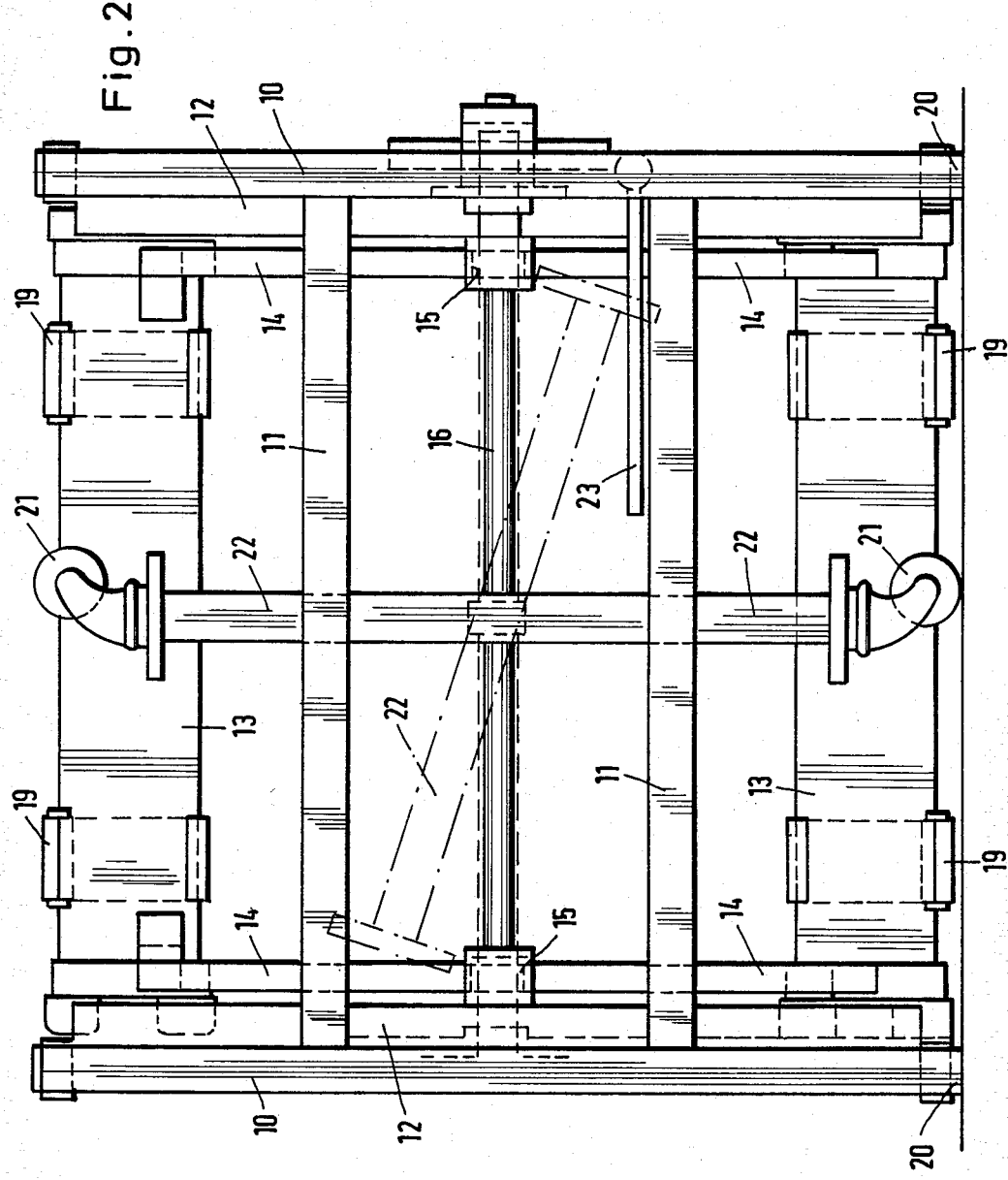
FIG. 2 is a side view from the left-hand side of FIG. 1.
Figure 3:
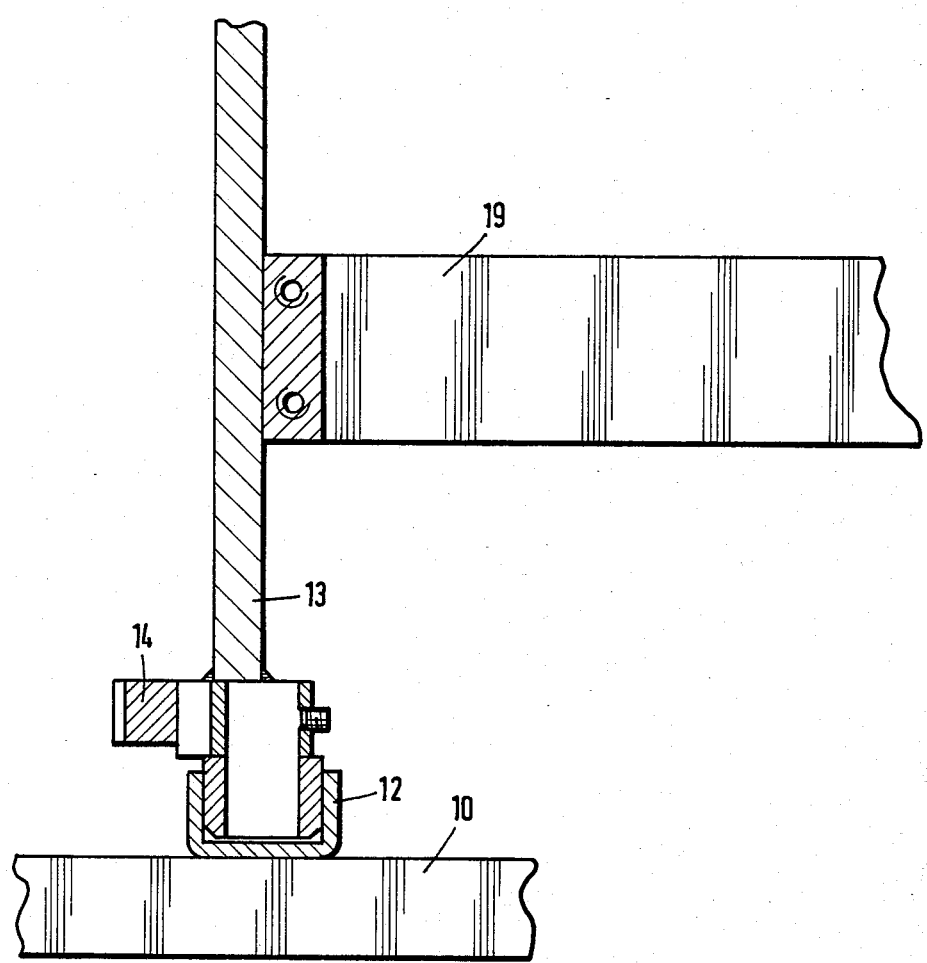
FIG. 3 is a section along line III—III of FIG. 1.
Figure 4:
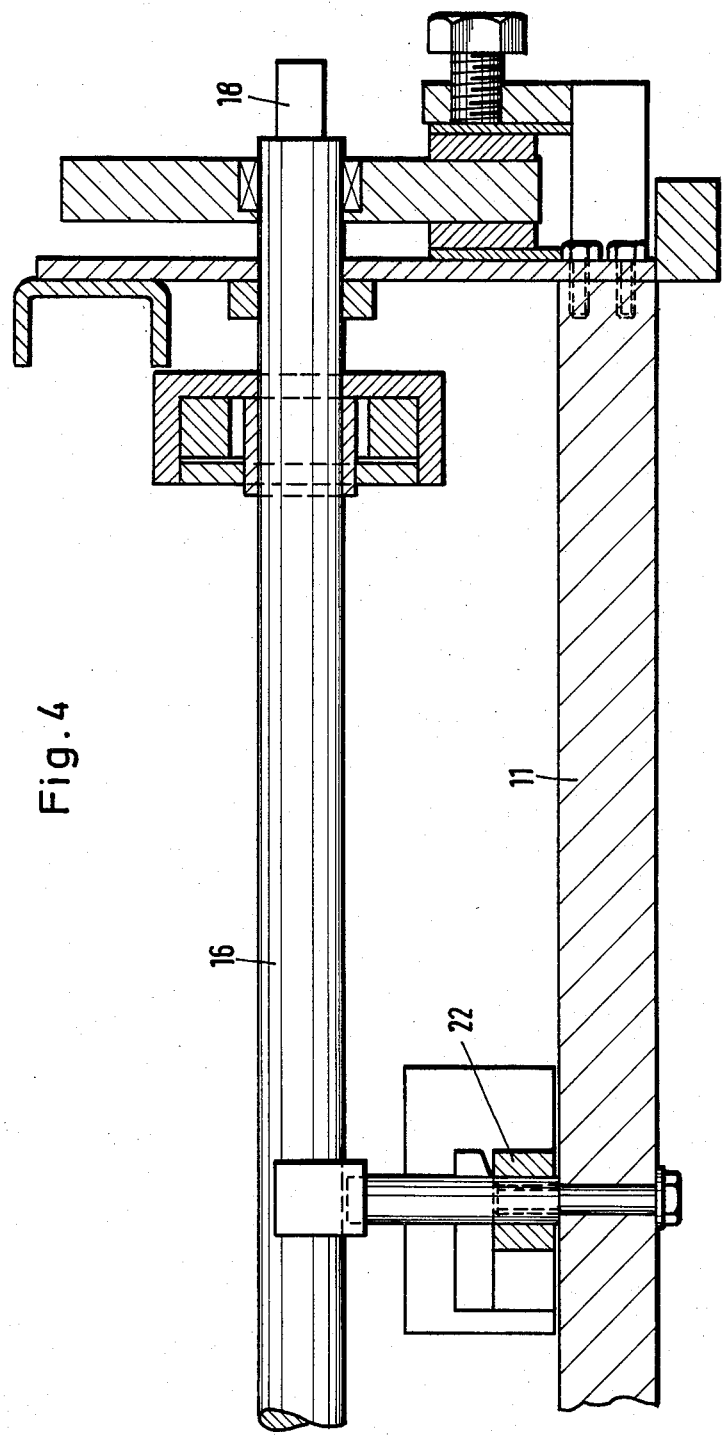
FIG. 4 is a section along line IV—IV of FIG. 1.
Figure 5:
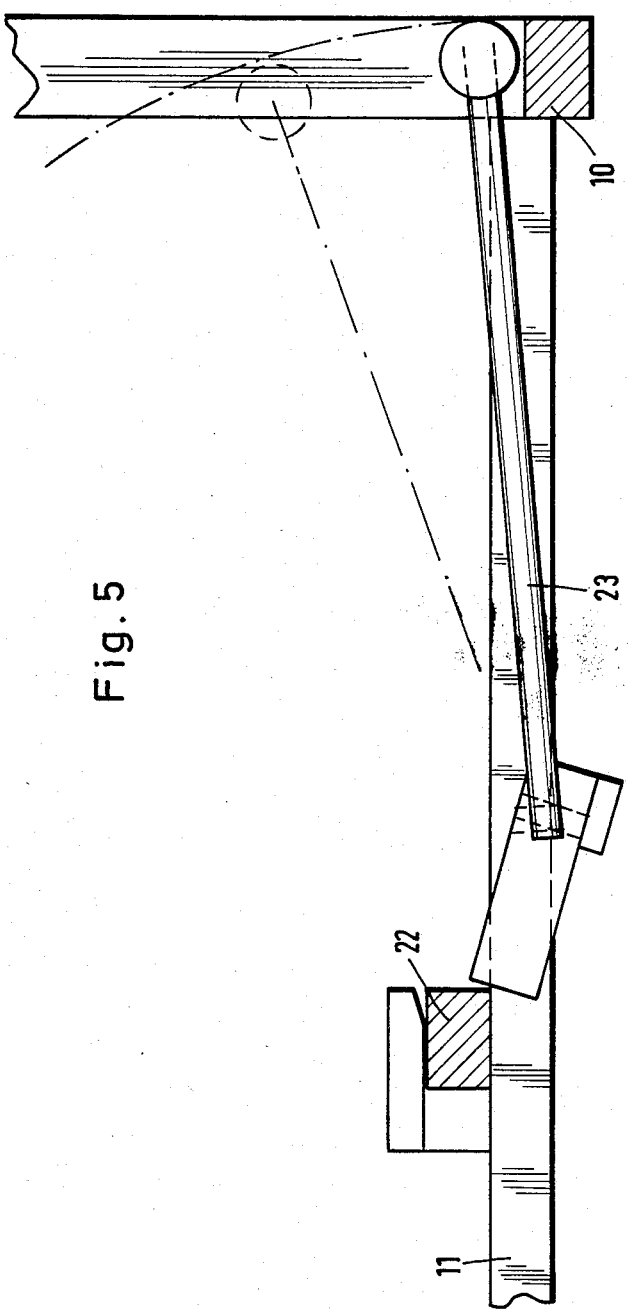
FIG. 5 is a section along line V—V of FIG. 1.

As is made particularly clear from FIGS. 1 and 2, the turnover device comprises a frame structure having two U-shaped runners 10 with cross-braces 11, which interconnect the runners. The frame formed in this way is equipped with rails 12, which act as guides for transverse members 13, which can be moved relative to one another. Each transverse member 13 is connected to a pair of racks 14 engaged by pinions 15, which are in turn fixed to the cross-braces 11 and consequently to the runners 10.

A shaft 16 with a square end 18, which can be operated by a wrench, is connected to the pinions 15, so that the latter can be turned for driving the racks. Through the rotation of the racks, the transverse members 13 are moved towards or away from one another.

Loading forks 19 are fixed to the transverse members 13, so that these forks can move with the transverse members. The loading forks are used for receiving and gripping the load, i.e. preferably the pallets. As will be seen in FIG. 1, the forks 19 are used to elevate a load relative to the frame elements 10, 11 and 12 to a position where the load is substantially at the elevation of the axis of curvature 23 of the arcuate sections of the U-shaped runners.

Rollers 20 are provided at the ends of runners 10 to enable the turnover device to be moved. In addition, two casters 21 are fitted to the frame structure with the aid of a rod 22 in such a way that they either project out of the area of the curved part of runners 10, or are located at retracted positions within this area (as shown by the broken line in FIG. 2).

With the aid of rollers 20 and casters 21, in operation, the turnover device is rolled up to a pallet which is to be turned over. The corresponding legs of the U-shaped runners, together with the bottom loading fork are moved beneath the pallet, the U-shaped runners 10 being arranged with respect to the loading forks in such a way that the axis and centre of curvature 23 is located in the vicinity of the centre of gravity 24 of the load 25, which is to be turned over. The centre of gravity 26 for the turnover device, when it has no load, is located approximately on the axis of shaft 16, of FIG. 1. If the turnover device is to be used for a load of approximately 200 kg and its own weight is approximately 175 kg, the overall centre of gravity 27 is somewhat to the left of the centre of curvature 23, if the load has dimensions of 60×80 cm and a height of approximately 1 m. If the same turnover device is to be used for a load of approximately 700 kg, the overall centre of gravity 28 is somewhat to the right of the centre of curvature of runners 10, but the distance is so small that the turnover device can still be easily operated by hand, i.e. can be turned over by hand.

If the turnover device is to be designed for larger loads, it must be borne in mind that the centre of gravity for the load is approximately at the centre of curvature 25 of runners 16 or is closer to the curved part of the runners.

As a result of the construction and dimensioning of the turnover device according to the invention, it is possible to obviate the use of complicated equipment, such as pneumatic or other hydraulic cylinders during the turnover process.

The device according to the invention is mobile and can be operated manually. Due to the fact that the loading forks 19 are close to the floor in the position where they are furthest apart and are essentially located level with rollers 20, 21, the device can be moved beneath pallets and other loads located on the floor. This is advantageous compared with known devices, in which the pallets first have to be raised to a corresponding height. Thus, the device according to the invention can also be used for transporting loads from one point to another.

It is naturally also possible within the scope of the invention to use hydraulic or pneumatic cylinders for operating the loading forks of the caster or casters. In this case, the piston rods are used for drawing the caster or casters into the vicinity of the runners.

It is obvious that when turning over pallets, over which is moved the turnover device according to the invention and which are secured by the loading forks, there is a pivoting of the complete turnover device about the curved portion of the U-shaped runners, so that the pallets can then be rotated by 180° and the turnover device rests on the other legs of the U-shaped runners following turning over. In the case of this turnover device, the casters 21 must be arranged in such a way that they do not impede this turnover process.

What is claimed is:

1. A turnover device, particularly for pallets, which has a frame structure with U-shaped runners and a mechanism having loading forks receiving the pallets, wherein the runners are so arranged with respect to the loading forks of the mechanism for receiving the pallets that the centre of curvature of the runners is located in the vicinity of the overall centre of gravity, including the pallets, and the free ends of the runners are provided with roller means, and at least one caster means is provided, which is positioned in the vicinity of the curvature area of the U-shaped runners, said caster means being movable between a position within the region of the runners and a position outside this region, said roller means and caster means being operable to support the device for horizontal movement to enable the loading forks to move into alignment with a pallet.

2. A device according to claim 1 wherein the loading forks can be moved toward and away from the legs in the region between the legs of the U-shaped runners.

3. A device according to claim 1, wherein two said caster means are provided, said caster means being fitted to the ends of a rod pivotable about their centre.

4. Apparatus for inverting a load, comprising a frame including U-shaped runners which have free ends and sections which are arcuate with respect to a transverse axis of curvature,
a mechanism mounted on the frame for supporting the load relative to the frame at a position where the overall center of gravity of the loaded apparatus is in the vicinity of said axis of curvature of the runners,
support means for supporting the frame for movement in a forward horizontal direction which lies generally transverse to the axis of curvature of the arcuate sections of the U-shaped runners to enable the mechanism to move into alignment with the load, said support means including at least one caster and rollers for movably supporting the frame, said rollers being mounted on the free ends of the U-shaped runners, said caster being movable from a ground engaging position where it projects from the space defined by said runners to a retracted position, said retracted position being located within the space defined by the runners so that when the caster is in its retracted position, a load may be inverted by turning the apparatus 180° on said runners.

5. The apparatus of claim 4 wherein said mechanism includes loading fork means which are movable toward and away from each other and are operable to receive and grip a load.

6. The apparatus of claim 5 having means for moving the loading fork means to elevate a load relative to the frame to a position where the load is substantially at the elevation of said axis of curvature of the runners.

7. The apparatus of claim 4 including two said casters, a rod having said casters mounted on its ends, said rod being pivoted about its center to move the casters between their retracted positions and their ground-engaging positions.

8. The apparatus of claim 7 wherein said mechanism includes loading fork means which are movable toward and away from each other and are operable to receive and grip a load.

9. The apparatus of claim 8 having means for moving the loading fork means to elevate a load relative to the frame to a position where the load is substantially at the elevation of said axis of curvature of the runners.

* * * * *